June 11, 1963  S. H. RASKIN  3,093,200
SYSTEM AND METHOD OF WEIGHING COUPLED RAILROAD CARS IN MOTION
Filed Oct. 22, 1957  2 Sheets-Sheet 1
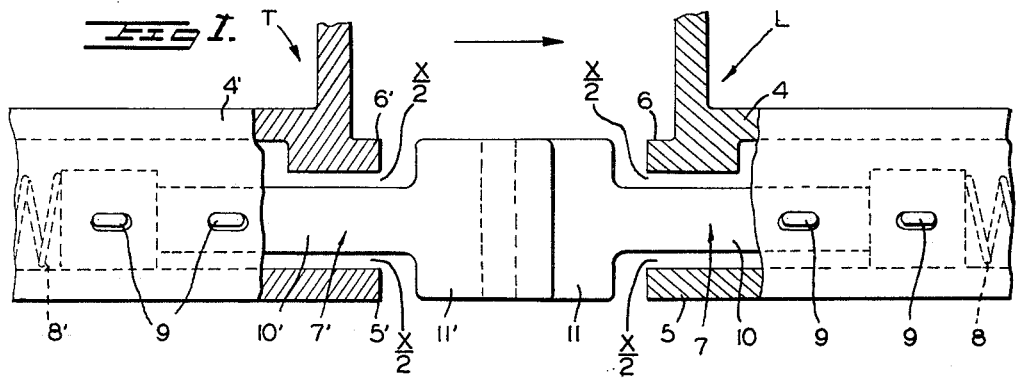
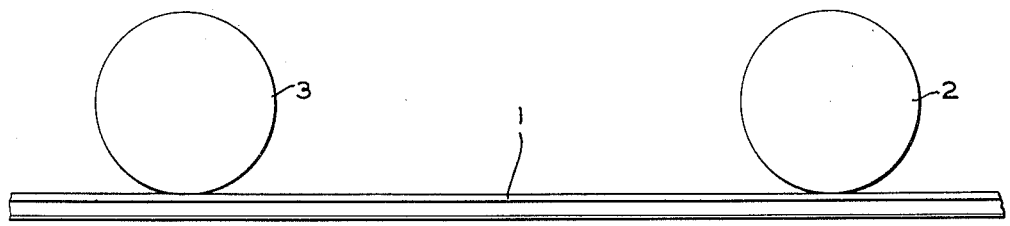
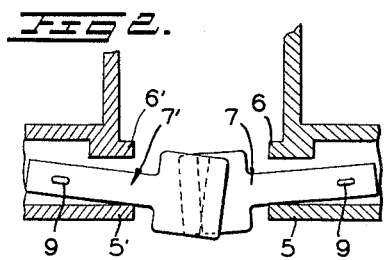
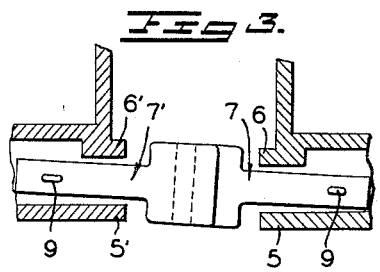
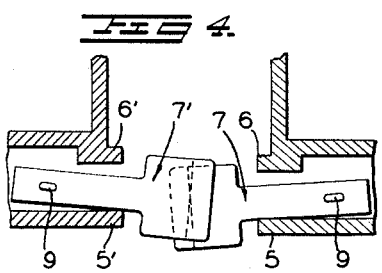
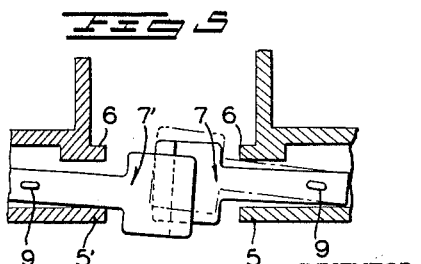
INVENTOR
SEYMOUR H. RASKIN
BY
ATTORNEYS June 11, 1963 S. H. RASKIN 3,093,200
SYSTEM AND METHOD OF WEIGHING COUPLED RAILROAD CARS IN MOTION
Filed Oct. 22, 1957 2 Sheets-Sheet 2
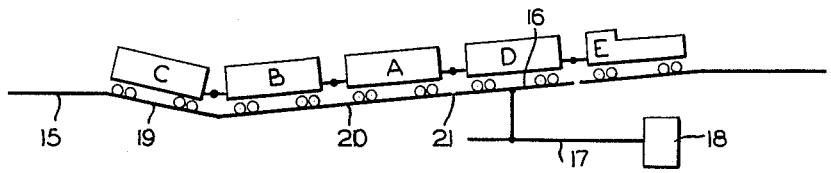
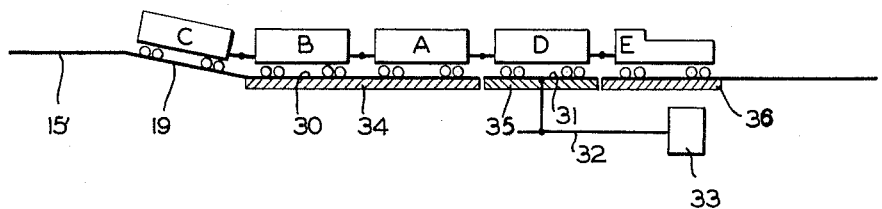
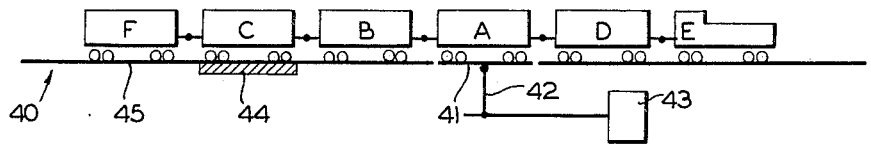
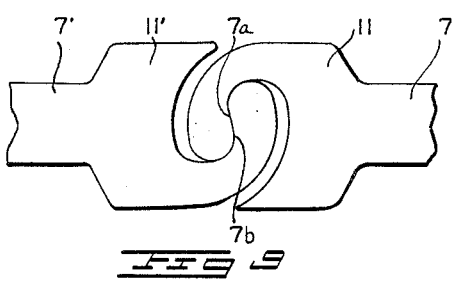
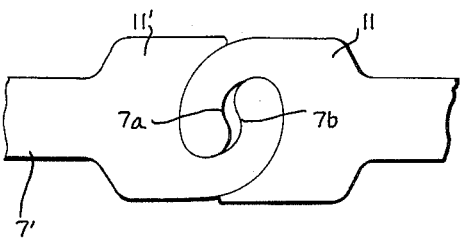
INVENTOR
SEYMOUR H. RASKIN
BY Pennie Edmonds Morton
Barrows & Taylor
ATTORNEYS United States Patent Office 3,093,200
Patented June 11, 1963

3,093,200
SYSTEM AND METHOD OF WEIGHING COUPLED
RAILROAD CARS IN MOTION
Seymour H. Raskin, Cincinnati, Ohio, assignor, by mesne
assignments, to Railroad Machinery Development Corporation, Cincinnati, Ohio, a corporation of Ohio
Filed Oct. 22, 1957, Ser. No. 691,747
5 Claims. (Cl. 177—1)

This invention relates to improvements in a system and method for weighing coupled railroad cars in a moving train. More specifically, the invention is directed to a system and a method whereby the weight of each individual car, coupled in a moving succession of cars, can be accurately obtained.

It is well known in the art that the weighing of cars coupled-and-in-motion effects great economies, especially when compared to uncoupled static weighing or uncoupled gravity weighing. It is also well known that obtaining accurate weights of individual cars of a moving train requires that at the time of weighing there be no transfer of vertical forces between the car being weighed and either of its adjacent cars through their mutually connected couplers, because any upwardly or downwardly acting external forces on the car being weighed will result in erroneous increases or decreases in the weight measurement. Such objectionable vertical forces frequently are caused by moving the train over track that is not level. Even though the draw bars of couplers are free to move vertically a short distance before striking an upper or lower sill of the striker casting which is rigidly connected to the car, difference in track level under adjacent cars frequently exceeds the free vertical movement of the draw bar, in which case one or both of the draw bars may be forced against a sill of the striker casting which limits vertical draw bar travel. Under such conditions, the couplers will become mis-aligned and will transfer vertical forces from one car to another. The couplers cannot relieve themselves of these vertical forces, because the horizontal pull in draft between the couplers results in a frictional resistance to vertical movement of one coupler in relation to the other sufficient to prevent them from shifting into an aligned position.

One notable present method of relieving the objectionable vertical forces between the couplers of connected cars is disclosed in the patent to Edward R. Marden, No. 2,621,035, December 9, 1952. According to this patent, the couplers are forcibly aligned in relation to each other and in relation to their respective cars, through means of deliberate sequential variations in the track elevation. However, such a method does not provide for two important conditions. First, in the case of a train having very few cars, the horizontal pull between couplers may conceivably be inadequate for maintaining the draw bars in a straight horizontal condition and raised free of their lower sills. In such a case, the two coupler draw bars, even though mutually aligned, could both be resting on the lower sills which limit their respective downward travel, and any vertical friction remaining between the mutually abutting coupler faces after forcible alignment would thereby result in a transfer of vertical forces. While it is true that this transfer of vertical forces would be less than the force required to support one of the draw bars free of its lower sill, such transferred forces could amount to several hundreds of pounds, and be objectionable. Second, the aforementioned present method does not provide for those conditions wherein adjacent cars may have their respective couplers mounted at different elevations. It is frequently found in practice that the elevation of the horizontal center line of couplers on one car may vary as much as one inch above or below that of adjacent couplers. Under such a condition, varied track levels would not assure forcible alignment of adjacent couplers.

The present invention contemplates a system and method for weighing coupled cars in a moving train in which the connected couplers of the cars are successively and positively conditioned so that vertically-acting forces between the couplers of adjacent cars will be successively relieved in advance of and during movement of each car across the weigh rail of the track. This relieving of the vertically-acting forces is independent of the normal variations of the heights of the coupler mountings of the cars making up the train.

The relieving of the vertically-acting forces between the couplers is accomplished by first accelerating the rate of motion of a trailing car relative to the rate of movement of its coupled leading car, and thereafter, and before the trailing car reaches the weigh rail to be weighed, decelerating its relative rate of movement. The relative acceleration of the rate of movement of the trailing car causes the abutting face of its forward coupler to move forward relative to the abutting face of the connected coupler of its leading car. This frees the couplers of all forces in draft and both couplers will then drop onto the lower sills of the respective coupler mountings. When the rate of movement of the trailing car subsequently is decelerated, the slack between the abutting faces of the couplers is taken up and the couplers again are connected in draft, but since the couplers were free from all vertically-acting forces when they were lying on their respective lower sills they will be free from all such forces when they again are connected in draft. After the couplers have been thus reconnected in draft, they will be maintained in that condition until the trailing car has passed over the weigh rail and has been weighed. Consequently, an accurate weight will be obtained.

The invention will be further described in connection with the accompanying drawings which more or less diagrammatically illustrates several ways for carrying out the invention.

In the drawings:

FIG. 1 is a diagrammatic view of a pair of couplers on adjacent cars, wherein the mutually connected couplers are under sufficient force in draft to maintain their respective draw bars in a substantially horizontal condition, in which they are free of both the upper and lower sills;

FIG. 2 is a diagrammatic view of the couplers in FIG. 1, except that they are under insufficient force in draft to maintain the couplers in a substantially horizontal position, and the couplers are being supported vertically at their head ends by their draw bars resting on their respective lower sills;

FIG. 3 is a diagrammatic view of a pair of couplers under the same force in draft as shown in FIG. 1, except that one of the coupler mountings is at a lower elevation than the other;

FIG. 4 is a diagrammatic view of the couplers shown in FIG. 3, except that they are under insufficient force in draft to maintain the couplers in a raised position;

FIG. 5 is a diagrammatic view of a pair of couplers between adjacent cars, wherein the head of one of the couplers is being vertically supported by the other coupler;

FIG. 6 is a diagrammatic view of one form of the present invention;

FIG. 7 is a diagrammatic view of another form of the invention;

FIG. 8 is a diagrammatic view of a third form of the invention;

FIG. 9 is a diagrammatic plan view of a pair of couplers between adjacent cars in which the couplers are connected in draft; and FIG. 10 is a diagrammatic plan view of the same couplers of FIG. 9, except that the couplers are in a condition of buff.

Referring now to the drawings, and first to FIG. 1, T and L diagrammatically represent the adjacent ends of two conventional cars of a train. These may represent any two cars of a train of any number of cars. The train is moving in the direction indicated by the arrow, so car L is the leading car and car T is the trailing car. The cars are supported on the usual front and rear trucks, each having front and rear axles on which the wheels for rolling on the track 1 are mounted. In FIG. 1, 2 represents one of the wheels of the rear axle of the rear truck of the leading car L and 3 represents one of the wheels of the front axle of the front truck of the trailing car T.

Each of the cars has the usual striker castings 4 and 4'. These castings are formed with lower sills 5 and 5' and upper sills 6 and 6'. Couplers 7 and 7' are mounted in each of the striker castings and are connected to the draft gear springs 8 and 8' by the usual keys 9 which extend through elongated horizontally-extending openings in the draw bars 10 and 10' of the couplers. The couplers 7 and 7' are of the conventional Janney type in which the coupler heads 11 and 11' have abutting force-transmitting faces when the couplers are connected in draft. With the couplers mounted as just described, the coupler draw bars are free to extend and to retract telescopically within the car body.

As shown in FIG. 1, the coupler heads are mutually connected in draft and sufficient forces are exerted on the keys 9 in opposite directions to maintain the couplers in a substantially horizontal position, with the draw bars 10 and 10' free from contact with both their upper and lower sills. In this position, the couplers are free to move vertically within the limits of the upper and lower sills by a distance $$\frac{x}{2}$$

upwardly and a like distance $$\frac{x}{2}$$

downwardly, a total vertical play of the distance $x$.

The couplers when in the position shown in FIG. 1 are in a condition which is acceptable for the weighing of car T while both car T and car L are coupled and in motion, the reason being that neither of the two couplers is resting on its lower sills nor are they bearing against their upper sills. Therefore, each of the two cars is carrying the weight of its own coupler only, and there can be no transfer of vertical loads from car T to car L, or vice versa, or from one coupler to another. In FIG. 1, the elevation of lower sill 5 on car L is equal to that of lower sill 5' on car T, and the elevation of the upper sills on cars L and T are also equal. Therefore, the horizontal center line of the two sill castings are the same.

In FIG. 2, the same couplers as shown in FIG. 1 are displaced relative to one another. In this case, the forces exerted in draft horizontally on the two connected couplers, through their respective keys 9 and draft gear springs 8 and 8', is insufficient to maintain the couplers in a raised position off of their respective lower sills 5 and 5', and each of the couplers is being supported by its own key 9 and by its own lower sills 5 and 5'. Therefore, neither coupler is being supported by its adjacent connected coupler, but is being vertically supported only by its own car. If car T is weighed under this condition, the indicated weight will be accurate because there is no transfer of upward or downward forces into car T from car L.

In FIG. 3, the couplers are similar to those shown in FIG. 1, except the horizontal centerline of the coupler mountings are of unequal height. Lower sill 5' of car T is at a higher elevation than lower sill 5 of car L. The upper sills 6 and 6' are also misaligned by the same distance. This elevational misalignment of coupler mountings on adjacent cars is commonly found in practice. However, since the elevation of the horizontal centerline of couplers is limited by specifications of the Association of American Railroads to plus or minus one-half inch, the vertical misalignment of one coupler mounting in relation to another coupler mounting can never exceed one inch. Since the total vertical play $x$ commonly found in couplers is approximately one inch, the misalignment of horizontal centerlines of striker castings will not exceed the allowable vertical play in the coupler draw bars. In the condition shown in FIG. 3, the draw bar of each of the couplers will never be in contact with either the upper or lower sill of its car as long as sufficient force in draft is maintained to keep the two couplers in a substantially straight line between their keys 9. It is therefore possible to accurately weigh car T while coupled to car L and while the cars are in motion, because in the condition shown there can be no transfer of vertical load from either car to the other through their connected couplers.

In FIG. 4, the coupler mountings are misaligned by the same amount shown in FIG. 3, but the horizontal force exerted in draft has been reduced and is now insufficient to lift two couplers into a mutual substantially straight line. In this case, each of the couplers has dropped down until its draw bar is supported by its respective lower sill. In this condition, each of the couplers is being supported vertically by its key 9 and by its lower sill, so that the total weight of each of the couplers is being carried by its respective car. This is also an acceptable condition for obtaining an accurate weight of car T while coupled to and in motion with car L.

In FIG. 5, the couplers between adjacent cars in the train are under appreciable horizontal forces in draft, but in this case the two couplers have become misaligned vertically, even though the sills of their respective cars are at equal elevations. This condition is frequently caused by running the adjacent cars over rough track. In this figure, the coupler 7' of car T is vertically supported by its key 9 and its lower sill 5', while the coupler 7 of car L is vertically supported by its key 9 and the head 11' of the coupler of car T. Therefore, the weight of the head 11 of the coupler on car L is being transferred to car T through its own coupler, and in turn through the coupler draw bar in contact with the lower sill 5' of car T. If car T is weighed while this condition exists in the couplers, the weight of car T would be erroneous by a value equal to the weight of the head end of the coupler on car L. It should be noted that the head of the coupler on car L is being supported free and raised above its lower sill 5 by vertical friction between the mutually abutting faces of the couplers due to the substantial horizontal force in draft which is maintained on the couplers.

Even though the draw bar 10' of coupler 7' of car T continues to rest on its lower sill 5', the coupler 7 of car L may become misaligned upwardly to even a greater extent until the draw bar 10 of the coupler of car L comes in contact with and bears against upper sill 6. Under this condition, shown in dotted lines, it is possible not only to record erroneous weights for car T equal to the weight of the free end of the coupler on car L, but it would also be possible for car L to transfer part of its load through its upper sill 6 to the draw bar 10 of its coupler, thence through head 11 of its coupler to head 11' of the coupler on car T, and further through the draw bar 10' on car T into lower sill 5' on car T. This condition could result in erroneous weights for car T equal to more than the weight of the free end of the coupler on car L, and the error could be so high as to correspond to the transferred force necessary to overcome the frictional force between the mutually abutting faces of the couplers.

The weighing system and method of the present invention, eliminates such conditions as shown and described in connection with FIG. 5, and assures that the connected couplers are placed in one of the conditions shown in FIGS. 1 to 4 just prior to the passage of the car to be weighed onto the weigh rail. In each of the conditions the couplers are freed from all vertically-acting forces, thereby assuring that a true and accurate weight of the car will be obtained.

Now, referring to FIG. 6 which illustrates one form of the present invention, 15 represents a railroad track over which a train consisting of an engine E and coupled cars A, B, C and D is being drawn. The track includes a weigh rail section 16 which is connected through a suitable lever system 17 to a weight indicator or recorder 18. Railroad scales embodying such weigh rails, lever systems and weight indicating and recording means are well known and in current use, so no further description of them is considered necessary.

At a short distance from the approach side of the weigh rail, the track 15 is formed with a downwardly-inclined or acceleration section 19. This section may have a vertical drop of about 12 inches over a distance of about 40 feet. Just beyond the end of the downwardly-inclined section, the track is inclined upwardly, as at 20, to a point beyond the exit end of the weigh rail 16. This forms a deceleration section of the track. Beyond this section the track again is horizontal. For purposes of illustration, both the angle of downward inclination and the angle of upward inclination are shown exaggerated in FIG. 6. The upward incline 20 is more gradual than the downward incline 19 and extends over a distance sufficient to carry two cars before the vertical rise of this section of the track equals the vertical drop of the section 19 at the point 21 on the track where the weigh rail begins. By having the elevation of the upper end of the downwardly-inclined section 19 the same as the elevation of the upper end of the upwardly-inclined section where the latter meets the weigh rail, a car having its rate of movement accelerated by gravity while passing down the section 19 will move downward the same amount it subsequently must move upwardly during its deceleration before it reaches the weigh rail. This assures that the velocities of the cars prior to the acceleration section of the track and subsequent to the deceleration section of the track will be constant. The continual upward incline of the track across the weigh rail and beyond will not cause further deceleration of the train as a whole because there will always be cars on this upwardly-inclined section of the track, and the drag effects due to gravity on this section of the track will be present in the train at all times and the steady pull of the engine must be such as to overcome that steady upgrade pull.

Since the weigh rail 16 is located on an upwardly-inclined section of the track, the weighing scale must be compensated for such incline in a manner well known in the art.

As seen in FIG. 6, engine E is pulling forward with the constant, steady pull, necessary to move the cars along the track. If this pull is maintained constantly, it can be seen that the rate of movement of car A and car B will tend to decelerate due to the upwardly-inclined section of the track. Conversely, the rate of movement of car C is being accelerated due to the additional forward force imparted to it by the down-grade portion of the track. In this situation, the mutually connected couplers between cars A and B will be in draft due to the deceleration of car B, as shown in FIG. 9, with the faces 7ª and 7ᵇ (FIG. 9) of the couplers 7 and 7' in abutting relationship. However, the mutually connected couplers between cars B and C will be in buff condition due to the deceleration of car B and acceleration of car C as it passes down the downwardly-inclined portion 19 of the track. This condition of the couplers in buff is shown in FIG. 10, where the faces 7ª and 7ᵇ are separated from one another. Meanwhile, car A has been decelerating for a sufficient length of time to reach a constant velocity which is maintained by the steady pull of engine E. Similarly, car D having already passed the position and condition of car A, is also under steady pull and moving at constant velocity. Therefore, the couplers between adjacent cars A and D and between car D and engine E are being maintained in draft, as shown in FIG. 9.

The passing of the couplers from a condition in which they are in draft to a condition in which they are in buff and then back to a condition in which they are in draft is accomplished by the successive passing of the cars down the downwardly-inclined track section 19 and then up the upwardly-inclined track section 20. As car C passes down the downwardly-inclined section 19 of the track, its velocity or rate of movement increases relative to that of car B. However, while car C is accelerating, car B is decelerating. Therefore, car C will catch up with car B and the couplers will go into buff, as shown in FIG. 10. Meanwhile, car B which has previously been accelerated and is now being decelerated, will ultimately decelerate to a point slow enough that car A will be moving at a velocity equal to car B. As car B continues to decelerate, its front couplers which are connected to the rear coupler of car A will go into draft. Cars A and D are now both moving at a constant velocity. However, car A preferably should not be weighed in the position shown, because car B may be going into draft through its coupler with car A at the time of weighing and this change in condition of the couplers might introduce an impact against car A which would cause a shock load on the weigh rail and thereby cause an erroneous weigh measurement. But car D which is now moving at constant velocity over the weigh rail is in an excellent position to be weighed. The mutually connected couplers between cars A and D have already been placed in draft as described above, and this condition of draft will be maintained at a relatively constant degree. Any shock load going into car A due to the impact of its coupler going into draft with the coupler of car B will not be appreciably transmitted as a shock to car D because of the draft gear spring mounting of the couplers. These springs 8 and 8' will take up the impact and, while the impact may be transferred to the next adjacent car, said impact will be so greatly diminished through the draft gear spring mountings that any impact transferred to the second adjacent car will be negligible. Thus, car D is moving at a constant velocity and the couplers at each end thereof are in a relatively steady state of draft.

Having established the condition of draft in the pairs of couplers at each end of the car being weighed, in this case car D, the sole remaining problem becomes that of relieving vertically-acting forces or transfer of loads between mutually connected couplers. This is accomplished as follows: As any given car goes over the acceleration or downwardly-inclined section 19 of the track, its velocity relative to the car ahead of it is quickly increased by such an amount that the couplers connecting the cars pass from a condition in draft, FIG. 9, to a condition in buff, FIG. 10. Now, as the trailing car decelerates, and tends to lag behind the car ahead of it, the condition of the couplers will change from one in buff back to one in draft. In going from a condition in buff to a condition in draft, or vice versa, it is necessary for the mutually connected couplers to pass through a condition wherein there is no contact between the couplers either in draft or in buff, due to the longitudinal play allowed in the couplers. When a mutually connected pair of couplers pass through this condition wherein there is no contact between the two couplers, there are no forces acting on the couplers either in draft or in buff. Therefore, there is nothing to hold the couplers in a substantially horizontal position raised free of their lower sills, and they will drop until they reach the bottom limit of their allowable play, when each of their draw bars 7 and 7' will rest upon and be supported by their respective lower sill 5 and 5', in one of the positions shown in FIGS. 2 or 4. At the instant of contact of the mutually abutting faces 7a and 7b of the couplers, when they pass from the condition in buff back to the condition in draft, the transfer of forces through this contact is solely that of horizontal forces inasmuch as each of the couplers has its own weight supported by its own car. As the forces in draft increase, due to continued deceleration of the trailing car, the pair of mutually connected couplers will be lifted from their respective lower sills and brought to the position shown in either FIG. 1 or FIG. 3. Having reached the position of FIG. 1 or FIG. 3, the couplers are in a condition which is acceptable for weighing, and this acceptable condition will be maintained until after the car has passed over the weigh rail and has been weighed, due to the continued steady pull over the upwardly-inclined section of the track.

Should the last few cars in a train have so little resistance to forward motion that the force in draft necessary to pull these cars at a constant velocity is insufficient to raise the mutually connected couplers off of their respective lower sills, the couplers will remain in one of the positions shown in FIG. 2 or FIG. 4. These also are acceptable positions for weighing since each car is carrying the entire weight of its coupler and none of the weight of the cooperating connected coupler nor any of the weight of the car to which the connected coupler is attached. When a car is being weighed, the mutually connected couplers at each end of the car must be in one of the foresaid acceptable conditions. It would be unacceptable to have a car on the weigh rail while its couplers are changing from one condition to another. Therefore, even though accelerating one car in relation to another may relieve the vertical forces in the mutually connected couplers between the adjacent cars, it is mandatory that the subsequent deceleration be sufficient to cause the couplers to re-engage in draft well before the car reaches the weigh rail, so that they are in one of the acceptable conditions for weighing. In the form of the invention shown in FIG. 6, this is accomplished by the upwardly-inclined section 20 of the track. As previously indicated, this section preferably is sufficiently long to carry two cars, such as the cars A and B, while a third car D is on the weigh rail. If the section 20 is of this length, a car, such as the car C, rolling from the downwardly-inclined section and being recoupled to the car B in draft, will not cause shock loads to be transmitted to the car on the weigh rail.

From the foregoing, it is obvious that means must be provided for imparting a rapid acceleration of the forward movement of each successive car relative to that of its coupled leading car for a short period of time prior to the cars reaching the weigh rail, to assure release of all vertically-acting forces on the couplers, after which the rate of movement of the successive cars must be decelerated relative to their coupled leading cars to assure recoupling of the cars in draft prior to their reaching the weigh rail.

FIG. 7 shows a second form of the invention embodying the same principles as the form of the invention shown in FIG. 6. In this form of the invention, the track 15' has a downwardly-inclined section 19' the same as the corresponding section 19 of FIG. 6 and is used in the same manner for accelerating the rate of movement of the successive cars as they aproach the weighing station. However, in this form of the invention the deceleration section 30 of the track is horizontal and the weigh rail 31 is located in this horizontal track section. This weigh rail, like that of FIG. 6, is connected through conventional linkage 32 to a conventional weighing or recording mechanism 33.

Since a substantially horizontal track will decelerate each successive car only to the extent of the rolling friction of the wheels of the cars, the deceleration time and distance required by cars of different weights and different frictional characteristics will vary. Since it is necessary to assure that each successive car has been decelerated and is moving at a constant velocity prior to passing onto the weigh rail, it is necessary to impart deceleration to each successive car by some means external to the characteristics of the car itself. Such a deceleration is imparted in this case by mechanical retarders 34, 35 and 36, such as are common in the art. These retarding devices for deceleration extend from a point immediately beyond the acceleration or downwardly-inclined section 19' of the track and continue all the way to the weigh rail and beyond. If the car passing over the weigh rail and being weighed had just been released from the drag imparted by the retarder 34, the car passing over the weigh rail would, due to this suddenly reduced drag, again begin to accelerate. This condition of acceleration while passing over the weigh rail is undesirable, and in order to avoid such second acceleration, retarder 35 is placed on the scale adjacent the weigh rail for continued drag while the car is passing over the weigh rail. Retarder 36 is similarly placed beyond the weigh rail so that the car which has just passed over the scale will also be under drag. In this manner, the car on the weigh rail and being weighed is under the drag influence of retarders and will not accelerate. The car which has just left the weigh rail similarly will not accelerate, and the car trailing such car on the weigh rail is also being retarded and has just reached a point of constant velocity. Since the retarder 35 is carried by the scale, any loading force transmitted to that retarder will be transmitted to the weight indicating or recording mechanism along with the balance of the weight of the car, and an accurate weighing will be obtained.

The structure disclosed in FIG. 7 will cause each successive car to be accelerated from its constant velocity, decelerated prior to passing over the weigh rail and passed across the weigh rail at a constant velocity. This action is the same as the accelerative and decelerative actions disclosed in FIG. 6, and the couplers will then be actuated in a similar manner to the action disclosed in relation to FIG. 6, and all vertical forces transferring from one car or coupler to another will be eliminated in a like manner.

In FIG. 8, I have shown how the principles of acceleration and deceleration of FIGS. 6 and 7 may be carried out on a horizontal stretch of railroad track.

In this figure a train consisting of an engine E and any number of cars, represented by the cars A, B, C, D and F are passing over a horizontal track 40 including a weigh rail 41 connected through linkage 42 to a weight indicating or recording mechanism 43, as in the preceding forms of the invention. A conventional retarder 44 is located along the track 40 a distance greater than the length of a car from the weigh rail at the approach side thereof. The retarder 44 applies a retarding force against the wheels of the successive cars shortly prior to their passage onto the weigh rail for weighing. A shown in this figure, car C is under the retarding effects of a retarder 44 which acts to decelerate car C in relation to car F. Therefore, car F is accelerating forwardly in relation to car C and the mutually connected couplers between cars F and C will go into a condition of buff. However, car B has already been decelerated by the retarder and has now passed out of the effects of the retarder. At the instant shown, car B has reached constant velocity. Therefore, car B being on one side of car A, is at constant velocity, car A, which is on the weigh rail, is at constant velocity, and the car ahead of car D is at constant velocity, all of which constitutes an acceptable velocity condition for the weighing of car A. The couplers on both ends of car A and the mutually connected couplers of cars A and B are in a condition of draft, as shown in FIG. 9. The mutually connected couplers between cars C and F are in a buff condition, as shown in FIG. 10. The acceleration of car F in relation to car C is taking place a distance of at least two car lengths from the weigh rail, that is, there are at least two cars between car F and car A.

In FIG. 8, the track section 45 immediately in advance of the retarder 44 as the train approaches the weighing station is the accelerating section of the track since it is the car on this section of the track which is having its rate of movement accelerated as a result of the retarding forces applied to the car ahead of it by the retarder 44. Hence, this section of the track corresponds to the downwardly-inclined sections 19 and 19' of FIGS. 6 and 7, respectively.

The acceleration and the subsequent deceleration of the rate of movement of the successive cars as they approach the weighing station, and the relieving of all vertically-acting forces on the mutually connected couplers of the cars are the same with respect to this embodiment of the invention as that shown in FIGS. 6 and 7.

In each of the forms of the invention shown in FIGS. 6, 7 and 8, the car being weighed is traveling at a constant velocity and the mutually connected couplers of the car being weighed and the cars ahead and behind of the car being weighed are under draft; the car which is immediately behind the car being weighed is also traveling at a constant velocity, but is being subjected to longitudinal impacts due to relative acceleration between it and the car which is second next to the weigh rail; the car which is second next to the weigh rail behind the car being weighed is being decelerated in relation to the car which is next to the weigh rail; the car which is trailing the other cars and is third next to the weigh rail is being accelerated in relation to the car which is second next to the weigh rail; the distance between the acceleration portion of the track and the weigh rail is at least two car lengths; and deceleration prior to the weigh rail always equals acceleration.

In brief, the method which is followed in each of FIGS. 6, 7 and 8 is, (step 1) change the distance between each given car in relation to the car ahead of it so that the engaged couplers are relaxed and may drop by gravity to their lowermost positions (if they are not already in such position); (step 2) change the distance between each given car in relation to the car ahead of it to bring the engaged couplers of those two cars into their car moving positions that is to bring about engagement of the cooperating coupler faces that transmit horizontal forces; (step 3) move the car at a constant velocity prior to passing over the weigh rail; and (step 4) maintain the movement of the car at the constant velocity while passing over the weigh rail. Step 1 is obtained either by accelerating a car in relation to the car ahead of it (FIGS. 6 and 7) which is the same as decelerating a car with respect to the car behind it, namely the condition of FIG. 8. The phrase "accelerating a car with respect to the car ahead of it" means exactly the same thing as "decelerating a car with respect to the car behind it".

The invention has been illustrated in connection with a system of single draft weighing, that is, where the entire car being weighed is carried by the weigh rail and the entire weight of the car is obtained in one weighing operation. However, the invention is equally applicable to multiple draft weighing where the weight on each truck, or each axle of each truck, is obtained in separate weighing operations and the indicated weights totaled to give the weight of the entire car, such methods of multiple draft weighing being well known. It also is to be understood that various other changes may be made in both the system and method of weighing without departing from the scope of the sub-joined claims or sacrificing any of the advantages of the invention.

In the appended claims where reference is made to the engaged couplers being "in draft", the phrase "in draft" is to be given a broad interpretation meaning a condition where the engaged couplers are in such relative position that one coupler transmits to the other coupler a force for moving the train in its direction of movement. The two joined couplers may be in pulling relation, as in FIG. 9, or in pushing relation, as in FIG. 10.

I claim:

1. In the method of weighing coupled railroad cars while in motion in which the cars are passed over a weigh rail and weighed; the improvement which comprises passing the cars successively over a downwardly-inclined rail section a short distance prior to their passage onto the weigh rail to accelerate the rate of movement of each successive trailing car of a train of cars relative to the rate of movement of its coupled leading car an amount sufficient to free the couplers of forces in draft, thereafter, and before passing the cars onto the weigh rail, passing the cars along a substantially level rail section, applying a mechanical retarding force to the cars as they successively pass along said substantially level rail section to decelerate the rate of movement of each trailing car relative to the rate of movement of said leading car sufficient to cause the couplers to engage in draft before said trailing cars successively reach the weigh rail, and maintaining said cars coupled in draft until after said trailing car has passed over the weigh rail.

2. In the method of weighing coupled railroad cars while in motion in which the cars are passed over a weigh rail and weighed; the improvement which comprises accelerating the rate of movement of each successive trailing car of a train of cars relative to the rate of movement of its coupled leading car a short distance prior to its passage onto the weigh rail an amount sufficient to free the couplers of forces in draft, thereafter decelerating the rate of movement of each trailing car relative to the rate of movement of said leading car sufficient to cause the couplers to engage in draft before said trailing cars reach the weigh rail, said deceleration being obtained by applying a mechanical retarding force to at least one wheel of said trailing car, said retarding force beginning before said wheel passes onto the weigh rail and continuing until said wheel passes over the weigh rail.

3. In the method of weighing coupled railroad cars while in motion in which the cars are passed over a weigh rail and weighed; the improvement which comprises passing the cars successively over a downwardly-inclined rail section a short distance prior to their passage onto the weigh rail to accelerate the rate of movement of each successive trailing car of a train of cars relative to the rate of movement of its coupled leading car an amount sufficient to free the couplers of forces in draft, thereafter, and before the successive trailing cars pass onto the weigh rail, decelerating their rate of movement relative to the rate of movement of their respective leading cars sufficient to cause the couplers to engage in draft before said trailing cars reach the weigh rail, the deceleration of the rate of movement of said trailing cars being obtained by applying a mechanical retarding force to at least one of the wheels of said cars, and maintaining said cars coupled in draft after said trailing car has passed over the weigh rail.

4. In the method of weighing coupled railroad cars while in motion in which the cars are passed over a weigh rail and weighed; the improvement which comprises accelerating the rate of movement of each successive trailing car of a train of cars relative to the rate of movement of its coupled leading car a short distance prior to its passage onto the weigh rail an amount sufficient to free the couplers of forces in draft, thereafter decelerating the rate of movement of each trailing car relative to the rate of movement of its respective leading car sufficient to cause the couplers to engage in draft before said trailing car reaches the weigh rail, moving said successive trailing cars at a constant velocity after their rate of movement has been accelerated and thereafter decelerated and before they pass onto the weigh rail, and maintaining said cars coupled in draft until after said trailing cars have passed over the weigh rail.

5. In the method of claim 4, the further improvement which comprises moving said trailing car at a constant velocity while passing over the weigh rail.

References Cited in the file of this patent
UNITED STATES PATENTS

| | | |
|---|---|---|
| 1,681,131 | Prescott | Aug. 14, 1928 |
| 2,543,806 | Roeser | Mar. 6, 1951 |
| 2,621,035 | Marden | Dec. 9, 1952 |